US011112372B2

(12) United States Patent
Grof et al.

(10) Patent No.: US 11,112,372 B2
(45) Date of Patent: Sep. 7, 2021

(54) X-RAY FLUORESCENCE SYSTEM AND METHOD FOR IDENTIFYING SAMPLES

(71) Applicants: SOREQ NUCLEAR RESEARCH CENTER, Yavne (IL); SECURITY MATTERS LTD., D. N. Hevel Eilot (IL)

(72) Inventors: Yair Grof, Rehovot (IL); Tzemah Kislev, Mazkeret Bathya (IL); Nadav Yoran, Tel Aviv (IL); Haggai Alon, Kibbutz Naan (IL); Mor Kaplinsky, Herzliya (IL)

(73) Assignees: SOREQ NUCLEAR RESEARCH CENTER, Yavne (IL); SECURITY MATTERS LTD., D. N. Hevel Eilot (IL)

( * ) Notice: Subject to any disclaimer, the term of this patent is extended or adjusted under 35 U.S.C. 154(b) by 259 days.

(21) Appl. No.: 16/334,431

(22) PCT Filed: Sep. 17, 2017

(86) PCT No.: PCT/IL2017/051050
§ 371 (c)(1),
(2) Date: Mar. 19, 2019

(87) PCT Pub. No.: WO2018/051353
PCT Pub. Date: Mar. 22, 2018

(65) Prior Publication Data
US 2021/0048399 A1 Feb. 18, 2021

Related U.S. Application Data

(60) Provisional application No. 62/396,412, filed on Sep. 19, 2016.

(51) Int. Cl.
*G01N 23/223* (2006.01)

(52) U.S. Cl.
CPC ..... *G01N 23/223* (2013.01); *G01N 2223/076* (2013.01); *G01N 2223/1016* (2013.01)

(58) Field of Classification Search
None
See application file for complete search history.

(56) References Cited

U.S. PATENT DOCUMENTS

| 4,048,496 A | 9/1977 | Albert |
| 6,069,934 A | 5/2000 | Verman et al. |

(Continued)

FOREIGN PATENT DOCUMENTS

GB 2476255 A 6/2011

*Primary Examiner* — Hoon K Song
(74) *Attorney, Agent, or Firm* — Browdy and Neimark, P.L.L.C.

(57) ABSTRACT

A control system and method are presented for controlling operation of an X-ray Fluorescent (XRF) system for detecting at least one material carried by a sample, for example at least one marker carried by the sample. The control system comprises: data input utility for receiving input data comprising material/marker related data about said at least one material/marker; and data processor and analyzer utility. The data processor and analyzer utility is configured and operable for analyzing the input data and determining optimal geometrical characteristics of the XRF system for optimizing operational conditions of said XRF system to maximize amount of primary X-ray radiation that reaches a predetermined region of the sample and is absorbed by a volume of said region and to maximize a portion of secondary radiation emitted from said region that reaches a detector of the XRF system; and for generating operational data to the XRF system enabling adjustment of the geometrical characteristics of the XRF system.

13 Claims, 2 Drawing Sheets

(56) References Cited

U.S. PATENT DOCUMENTS

| | | | |
|---|---|---|---|
| 2008/0226025 A1* | 9/2008 | Harding | ............... G01N 23/223 |
| | | | 378/44 |
| 2010/0046700 A1 | 2/2010 | Sakai et al. | |
| 2014/0151569 A1 | 6/2014 | Schnablegger et al. | |
| 2015/0051877 A1 | 2/2015 | Bakeman et al. | |
| 2016/0252471 A1 | 9/2016 | Guo et al. | |
| 2020/0184465 A1* | 6/2020 | Kislev | .................. G06K 7/1099 |

* cited by examiner

X-RAY FLUORESCENCE SYSTEM AND METHOD FOR IDENTIFYING SAMPLES

TECHNOLOGICAL FIELD AND BACKGROUND

The present invention is generally in the field of X-Ray Fluorescence (XRF) techniques, and relates to an XRF system and method.

X-ray fluorescence (XRF) systems are widely used for analyzing chemical composition of a sample. The operational principles of XRF system is based on exposing a sample to high energy primary radiation from X-ray source, thereby causing X-ray fluorescent response from the sample which is detected and analyzed. Each atomic element of the sample produces its unique fingerprint, i.e. a unique set of characteristic fluorescence X-rays. The X-ray fluorescence analyzer analyzes the spectrum of the characteristic X-rays emitted by the different elements in the sample and determines the chemistry of the sample.

Most of the XRF systems in use today are generally of two categories: Energy Dispersive (ED) and Wavelength Dispersive (WD) spectrometers. The systems of these two categories utilize various configurations of XRF tool arrangements including X-ray sources, optics and detectors.

GENERAL DESCRIPTION

The present invention provides a novel XRF system/analyzer for measuring concentration of various materials in a sample. The XRF system of the invention is particularly useful for measuring the material composition (concentrations of materials) of one or more markers embedded in/carried by a sample. Such a marker may be located within at least a region of the sample (e.g. applied to the sample's surface, e.g. a multi-layer structure forming a film/coating on the sample's surface).

The XRF system may be configured as a small size (portable) device, e.g. handheld device, including an X-ray and/or Gamma ray source (e.g. X-ray tube), an X-ray detector, and possibly also radiation directing optics (e.g. collimators). In some embodiments of the invention, the system is configured as an energy dispersive XRF system.

According to the invention, geometrical characteristics of the XRF system are selected to improve/optimize the system performance, which is especially important for "reading" a material composition on a surface of a sample. Such geometrical characteristics of the XRF system may include one or more of the following: a distance from the X-ray source to a predetermined surface region of the sample (i.e. the surface region where the marker is expected to be located); a distance from this surface region to the detector (detection plane); angular orientation of an irradiation channel (the angle between the primary X-ray beam propagating from the X-ray source (primary beam propagation axis) and the surface of the sample); and angular orientation of a collection/detection channel (the angle between the secondary X-ray radiation coming from the sample (secondary beam axis) towards the detector and the sample's surface).

The adjustments of the above parameter(s)/characteristic(s) of the system may be carried out in accordance with the type of the marker material(s) which is/are to be measured, and the manner/method in which the marker is applied to or embedded within the sample.

The configuration of the portable XRF system of the invention is based on the inventors understanding of the following. One of the main factors limiting the efficiency and accuracy of small-size/portable XRF systems, and in particular battery-operated XRF systems, is their limited power which determines the intensity of the radiation at any given wavelength emitted from the radiation emitter (i.e. the X-ray tube) of the XRF system. It is therefore of great importance to achieve high efficiency in exciting the sample and the particular material whose concentration is being measured (e.g. a marker material) and in detecting the secondary radiation arriving from the sample. Namely, the goal is (i) to optimize/maximize the amount of primary X-ray radiation that reaches the sample and is absorbed by the sample, and in particular the portion/fraction of that radiation that is absorbed by the element/marker that is to be measured, and (ii) to optimize/maximize the portion of the secondary radiation emitted from the measured element (the radiation emitted in response to the radiation incoming from the source) that reaches the detector.

It should be understood that considering the use of XRF system for reading a marker structure carried by a sample, maximizing the amount of primary X-ray radiation reaching the sample and being absorbed by the sample should be such that the primary radiation is confined as much as possible to a desired volume of the surface region on the sample (i.e. volume where the marker(s) is/are present or expected to be present). By this, the probability of absorbing the primary radiation by said volume on the surface of the sample is increased and the probability of penetration of the primary radiation through said volume of the surface region into the bulk of the sample is reduced.

In the XRF system of the present invention the source-sample-detector geometry is adjusted so as to optimize the above factors (i) and (ii). Such a portable XRF system/analyzer of the present invention with the optimized geometrical settings of the X-ray source and the detector relatively to the sample's plane increases the efficiency of the irradiation and detection process, and thus increases the accuracy of the identification/authentication results.

Thus, the present invention, in its one aspect, provides a control system for controlling operational conditions of an XRF system for measuring on a sample. The control system is typically a computer system including data input and output utilities (software/hardware), memory utility, and data processor and analyzer module. The data processor and analyzer module is preprogrammed for receiving input data including marker-related data about the marker(s) that is/are to be measured, processing the received input data to determine optimal geometrical characteristics of the XRF system defining optimal operational conditions of the system for measuring said marker(s), and generating corresponding output data for adjusting the geometrical characteristics of the XRF system.

The marker-related data may include location of the marker on a sample, and/or a lateral size of the surface region of the marker location, and/or a thickness of the marker structure defining the volume to be measured. As indicated above, the adjustable geometrical characteristics/parameters include one or more of the following: a distance between the X-ray source and a sample's plane, a distance between a detection plane and the sample's plane, and angular orientation of the irradiation and detection channels.

The control system (its data processor and analyzer utility) may also be configured to receive measured data detected by the XFT system to identify/the marker(s).

As indicated above, the XRF system with adjustable source-detector geometry with respect to a sample plane (or region/volume of interest on/in the sample), is particularly efficient in the case where at least some of the information about at least some of the materials to be detected on the surface of the sample (hereinafter 'markers') is known a priori, and more particularly when the manner by which the markers were applied to the sample and their locality is known. The markers may be materials added or applied to the sample for purposes of marking and identifying/authenticating the sample and/or for coding information (for instance information relating to the sample). Alternatively, the markers may be known materials which may originally exist on the surface of the sample but wherein their type and/or locality are, at least partially, known.

The inventors have also found that, for a given geometry of the XRF system, the intensity of the primary X-ray radiation arriving from the X-ray source to the sample can be increased by using scattering interfaces (plates) at the emitting end/plane of the X-ray source. The configuration of scattering interfaces can be selected in accordance with marker element(s)/material(s) to be detected. Indeed, primary radiation emitted by the X-ray source reaches the scattering plate(s) and is absorbed by the material of the scattering plate(s), thereby causing secondary radiation emission from the scattering plate via various processes (photoelectric effect, Compton and Rayleigh scattering) in the direction to the sample. Thus, the configuration (material composition and orientation) of the scattering plate assembly is selected in accordance with the wavelength of the secondary radiation from the plate and the direction of the irradiation path to be obtained.

Thus, according to one broad aspect of the invention, it provides a control system for controlling operation of an X-ray Fluorescent (XRF) system for detecting at least one material carried by a sample, the control system comprising:

data input utility for receiving input data comprising material-related data about said at least one material carried by the sample;

data processor and analyzer utility configured and operable for analyzing the input data and determining optimal geometrical characteristics of the XRF system for optimizing operational conditions of said XRF system to maximize amount of primary X-ray radiation that reaches a predetermined region of the sample and is absorbed by a volume of said region and to maximize a portion of secondary radiation emitted from said region that reaches a detector of the XRF system; and for generating operational data to the XRF system enabling adjustment of the geometrical characteristics of the XRF system.

More specifically, the invention is used for detecting one or marker(s). Therefore, the invention is described and exemplified below with respect to this specific application. It should however be understood that the invention is not limited to marker-related applications, and therefore the terms "marker" and "marker-related data" used hereinbelow should be interpreted broadly referring to "material" and "material-related data" in general. Also, the term "material" refers to any material composition/structure.

The marker-related data about said at least one marker comprises at least one of the following: a location of said at least one marker within the sample; a lateral dimension of a surface region of the sample where said at least one marker is located; and a thickness of said at least one marker structure defining said volume.

Preferably, the geometrical characteristics of the XRF system to be optimized comprise at least two of the following: a distance between a primary radiation emitting plane of the XRF system and a sample plane; a distance between a detection plane of the XRF system and a sample plane; angular orientation of an irradiation channel defined by the XRF system; and angular orientation of a detection channel defined by the XRF system. The geometrical characteristics may also comprise a configuration of a scattering plate assembly at an emitting end of an X-ray source to be used in the XRF system.

According to another broad aspect of the invention, there is provided an X-ray Fluorescent (XRF) system for use in detection of at least one marker carried by a sample, the XRF system comprising: an X-ray source for emitting primary radiation towards a sample plane; a detector for detecting secondary radiation from the sample; and a controller; wherein said controller is configured and operable for receiving operational data and adjusting geometrical characteristics of the XRF system comprising at least two of the following: a distance between a primary radiation emitting plane of the X-ray source and a sample plane; a distance between a detection plane of the detector and a sample plane; angular orientation of an irradiation channel defined by the X-ray source; and angular orientation of a detection channel defined by the detector.

The X-ray source may comprise a scattering plate assembly at an emitting end portion thereof. The scattering plate assembly is configured for absorbing the primary radiation and emitting secondary radiation of a desired wavelength and direction of propagation towards a predetermined region on a sample plane.

According to yet another broad aspect of the invention, it provides an X-ray Fluorescent (XRF) system for use in detection of at least one marker carried by a sample, the XRF system comprising: an X-ray source for emitting primary radiation towards a sample plane; a detector for detecting secondary radiation from the sample; wherein said X-ray source comprises a scattering plate assembly at an emitting end portion thereof, said scattering plate assembly being configured for absorbing the primary radiation and emitting secondary radiation of a desired wavelength and direction of propagation towards a predetermined region on a sample plane.

The above XRF system may further include or be connectable to a controller configured and operable for receiving operational data and adjusting geometrical characteristics of the XRF system, said geometrical characteristics comprising at least one of the following: a distance between a primary radiation emitting plane of the X-ray source and a sample plane; a distance between a detection plane of the detector and a sample plane; angular orientation of an irradiation channel defined by the X-ray source; angular orientation of a detection channel defined by the detector; and configuration of the scattering plate assembly to be used in the X-ray source.

In yet further broad aspect of the invention, it provides a method for use on X-ray Fluorescence (XRF) measurements on a sample for detecting at least one material carried by the sample, the method comprising:

providing material-related data about said at least one material, said material-related data comprising at least one of the following: a location of said at least one material within the sample; a lateral dimension of a surface region of the sample where said at least one material is located; and a thickness of a structure formed by said at least one material defining a desired absorbing volume of the sample;

analyzing the material related data and determining optimal geometrical characteristics of an XRF system to be used in the XRF measurements on said sample for optimizing operational conditions of the XRF system, to maximize amount of primary X-ray radiation that reaches said desired volume of the sample and is absorbed by said volume and to maximize a portion of secondary radiation emitted from said volume that reaches a detector of the XRF system; and generating operational data to be provided to a controller of the XRF system for adjusting geometrical characteristics of the XRF system, said geometrical characteristics comprising at least one of the following: a distance between a primary radiation emitting plane of the XRF system and a sample plane; a distance between a detection plane of the XRF system and a sample plane; angular orientation of an irradiation channel defined by the XRF system; angular orientation of a detection channel defined by the XRF system; and a configuration of a scattering plate assembly at an emitting end portion of the XRF system.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

The present invention provides a novel control system and method for controlling and optimizing the performance of a portable XRF system, by optimizing the operational conditions of the system. Such operational conditions to be optimized include the size of an irradiated region on a sample's plane (spot size), relative amount of primary radiation absorbed by the irradiated region (i.e. a ratio of the emitted radiation and the radiation absorbed by the irradiated region), and amount of detected secondary radiation. The operational conditions are optimized by properly adjusting geometrical characteristics of the XRF system.

Figure 1A:
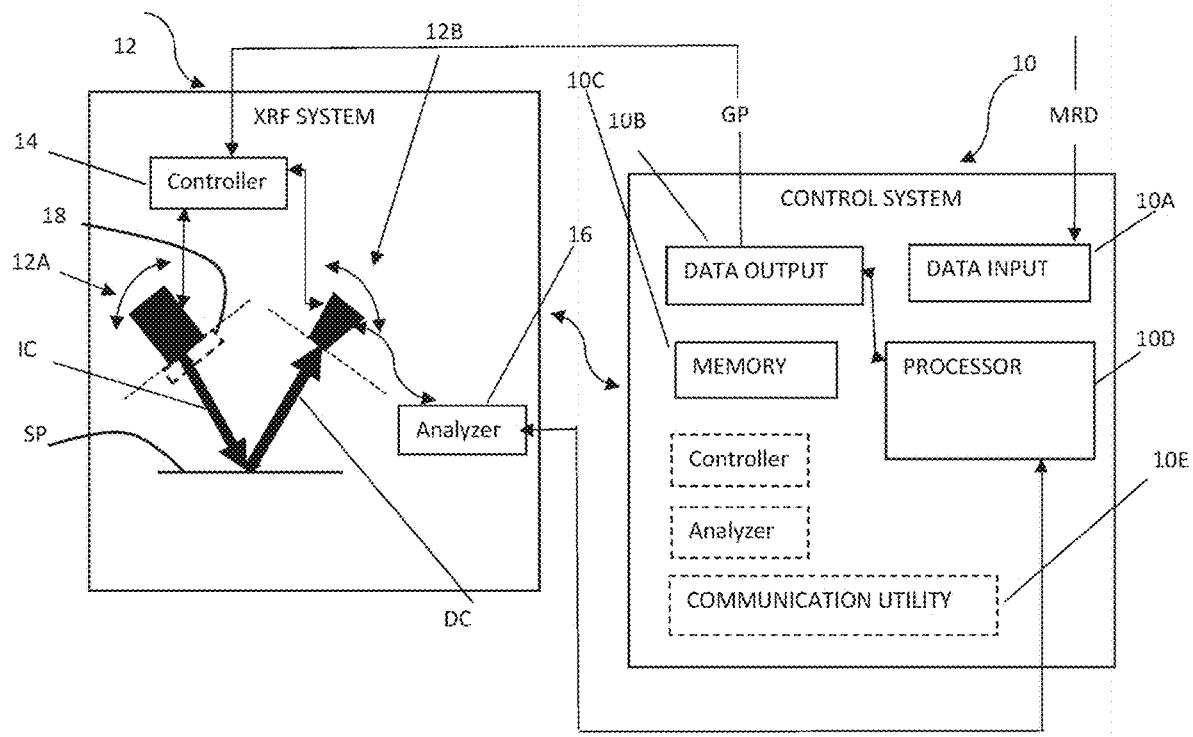
FIG. 1A is a block diagram of a control system of the invention for controlling/optimizing/adjusting the geometrical characteristics of an XRF system.
Figure 1B:
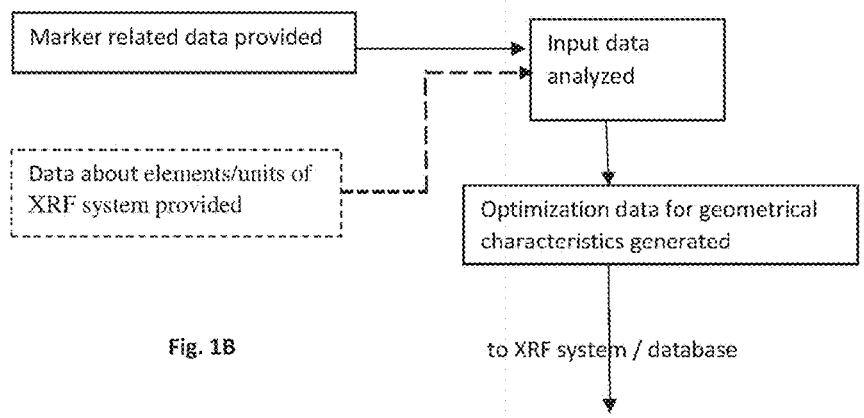
FIG. 1B is a flow diagram exemplifying a method of the invention for controlling/optimizing/adjusting the geometrical characteristics of an XRF system.

Reference is made to FIGS. 1A and 1B illustrating, by way of a block diagram and a flow diagram, the configuration and operation of a control system 10 for controlling/adjusting geometrical characteristics of an XRF system 12 to optimize the operational conditions of the system 12 to measure (identify/authenticate) one or more markers on a sample. The XRF system 12 to be optimized includes an X-ray source/emitter 12A defining an irradiation channel (or primary radiation channel) IC with respect to a region to be irradiated in a sample plane SP, and a detector 12B defining a detection channel (or secondary radiation channel) DC with respect to said region the sample's plane SP.

The control system 10 is configured as a computer system and includes such main functional utilities as data input utility 10A, data output utility 10B, memory 10C, and data processor and analyzer 10D. The system 10 receives input data including marker-related data MRD about one or markers to be measured by the XRF system 12, and possibly stores this data in the memory 10C. Also, the system may receive (e.g. via access to a respective storage utility) some data about the elements/units of the XRF system 12 to be optimized. The data processor and analyzer 10D analyzes the marker-related data MRD and determines an optimal geometrical characteristics/parameters GP for the accommodation and orientation of the X-ray source and detector 12A and 12B with respect to the sample's plane SP or at least one region in the sample's plane. For example, the input data may include given geometrical parameters, and thus the processor and analyzer 10D determines and generates output data indicative of adjustment values for such parameters.

The output data GP is properly formatted and transmitted to a controller 14 of the XRF system. As shown in the figure, the controller 14 may be part of the XRF system 12 or part of the control system 10, or various modules of the controller 14 may be distributed between the XRF system 12 and the control system 10. The control system 10 may also include an appropriate communication utility for data communication with the XRF system (e.g. appropriate wireless communication). As also illustrated in the figure, the same control system may be configured for analyzing measured data obtained by the XRF system. An XRF analyzer 16 may thus be part of the XRF system 12 or of the control system 10 or its software modules may be properly distributed between the two systems.

In some embodiments of the invention, the control system 10 is a stand alone system accessible via a communication network and associated with a network website. The control system 10 can thus "configure" the optimal geometrical characteristics of an XRF system (i.e. defining operational settings/conditions for an XRF system) per demand/request received via the network and generate and transmit the optimized geometrical characteristics to the XRF system side. The controller at the XRF system may analyze the received geometrical characteristics and adjust the respective system parameters.

As indicated above, the marker-related data MRD may include location of the marker on a sample and/or a lateral size of the surface region of the marker location and/or a thickness of the marker structure defining the volume to be measured. The adjustable geometrical characteristics/parameters include one or more of a distance between the X-ray source and a sample's plane, a distance between a detection plane and the sample's plane, and angular orientation of the irradiation and detection channels. In this connection, it should be understood that with respect to the distances from the sample to the source and detector, such parameters as output source plane or emitting plane, detection plane and sample plane should be considered.

In a least restrictive example, the marker is not localized at all but is present in relatively constant concentration throughout the sample. The optimal source-sample-detector geometry for detecting and measuring the concentration of one or more markers is set according to the type and possibly the combination of the markers. For example, for measuring lighter elements it would be beneficial to keep the emitter (source) and more importantly the detector (detection plane) as close as possible to the surface of the sample. Such a configuration, on the other hand, may reduce the area which is irradiated by the primary beam (the spot size) and which is read or 'seen' by the detector. Therefore, for measuring heavier elements it may be better to increase the spot size at the expanse of the increasing the distance between the emitter and the sample or the distance between the detector and the sample.

For example, the markers may be localized to a restricted area on the surface of the sample. Clearly, in this case in order to achieve the best X-ray response signal from the marker in the sample the joint area which is radiated and which is seen by the detector should coincide (generally, substantially overlap) and coincide (substantially overlap) with the restricted area where the marker is present. A larger area would include more of unmarked sample reducing the Signal to Noise Ratio (SNR) of the detected signal from the marker, while a smaller area may generate less secondary radiation thus again reducing the SNR. Thus, accommodating and orienting the emitter and detector (by adjusting the angles above) so as to cover exactly the restricted area containing the marker would be the optimal geometry setting.

In a different example, the marker may be applied to the entire surface of the sample or to relatively large surface area(s) of the sample but confined to a layer or layered structure (the marker layer(s)) of preselected relatively small thickness. In this example, in order to achieve the optimal response signal from the marker, one should orient propagation axes of the primary and secondary radiations (i.e. orient the irradiating and detection channels) at such angles that the primary radiation photons coming in from the emitter would not penetrate through the marker layer, namely, that the incoming photons (majority of incoming photons) would be absorbed by the atoms within the layer containing the marker and not by atoms located beyond the layer where there are no marker atoms.

In a third example, the marker may be localized both in a relatively narrow layer and in a restricted surface area/region. In such a case an optimization of the source-sample-detector geometry should take into account both considerations.

The following are some examples of the optimization of the above-described geometrical parameters/characteristics and the considerations underlying the optimization.

Geometrical Considerations

Size of the joint area 'seen' by both the source and the detector Vs. the distance of the source and the detector from the sample.

The amount of radiation (the number of photons) absorbed by the sample grows with the size of the area of the surface of the sample that is irradiated by the primary radiation (the surface area "seen" by the emitter). Additionally, the intensity of the secondary radiation emitted by the irradiated region of the sample and detected by the detector grows with the size of the irradiated surface region area and 'seen' by the detector (namely, the surface area from which secondary radiation emitted by the sample would reach the detector). For given field of views (FOVs) of the emitted and detector (i.e. solid angles of radiation emission and collection), orienting the irradiation channel (primary radiation propagation path from the emitter to the sample) at a lower angle with respect to the sample plane increases the size of the irradiated region. In a similar way, orienting the detection channel (secondary radiation propagation path to the detector) at a lower angle with respect to the sample plane increases the effective size of the area 'seen' by the detector. On the other hand, orienting the irradiation and detection channels at lower angles with respect to the sample plane increases the distance the primary radiation passes from the emitter to the sample, and the distance the secondary radiation passes from the sample to the detector.

Figure 2A:
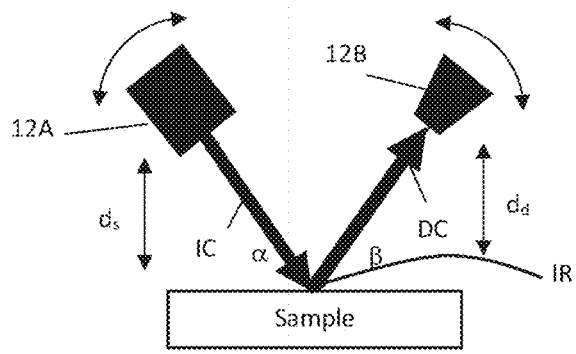
FIGS. 2A to 2C illustrate schematically three examples, respectively, of the geometrical characteristics of an XRF system.
Figure 2B:
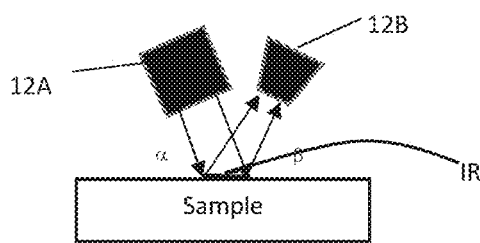
Figure 2C:
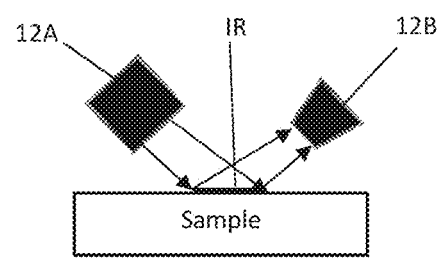

In this connection, reference is made to FIGS. 2A, 2B and 2C showing different accommodations of the source and detector with respect to the sample and different angular orientations of the irradiation and detection channels. As clearly shown in FIGS. 2A and 2B, for given angles α and β between the sample plane and, respectively, the irradiation and detection channels, increasing the distances $d_s$ and $d_d$ from the sample plane to, respectively, the source (emitting plane) and the detector (detection plane), results in a decrease in the size of the irradiated region IR (spot size). As shown in FIGS. 2B and 2C, maintaining the distances $d_s$ and $d_d$ and decreasing the angles α and β results in an increase in the size of the irradiated region IR.

It should also be understood that the increase of these distances $d_s$ and $d_d$ causes increase of losses since air at atmospheric pressure absorbs some of the radiation (both primary and secondary). The fraction of radiation absorbed by the air is determined mainly by the wavelength (energy) of the radiation. For low energy radiation emitted from elements of low atomic numbers (20 or lower), few millimeters of air are enough to absorb almost all of the passing radiation. Few millimeters of air would absorb relatively small fraction of high energy radiation of shorter wavelengths. Consequently, the optimal angles maximizing the intensity of primary radiation absorbed by the sample (and in particular by the markers within the sample) and eventually the intensity of secondary radiation from the markers to the detector, depend on the particular marker element whose concentration is to be measured.

For the purpose of measuring heavier elements it may be beneficial to increase the distance $d_d$ from the sample to the detector in order to reduce the intensity of detected radiation originating from lighter elements which are present within the sample. This would reduce background radiation and artifact peaks, and, as high energy photons from heavier elements are less affected by the distance, the signal to noise ratio of the measured spectrum is improved.

Path within the sample and the type and assembly of the marker

For the purpose of measuring the concentrations (relative or absolute) of one or more markers embedded within a sample it is important to increase the absorption of the incoming X-ray radiation by the one or more markers resulting in the emission of secondary radiation in one or more characteristic wavelengths. Namely, the goal is to increase the number of incoming X-ray photons absorbed by the markers at the expense of competing processes and in particular absorption by other materials present in the sample. In order to increase the probability for an incoming photon to be absorbed by the markers, the path of the radiation within the sample at regions where the markers are concentrated (expected) is to be increased.

Figure 3A:
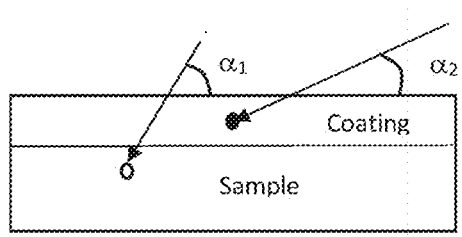
FIGS. 3A and 3B illustrate the principles underlying the selection of the system geometry.

In the case wherein the markers are present (expected) in the outer layer of the sample, for example when the markers are applied to a surface of solid sample such that a coating or a film (including the markers and possibly other materials) is formed on the surface of the sample, it is beneficial to design the XRF system such that the path of X-ray radiation arriving from the emitter is confined as much as possible to a volume of the sample where the markers are present. That is, it is desired to increase the probability of absorbing incoming radiation within the coating, while reducing the probability of an incoming photon to penetrate through the coating into the bulk of the sample. Referring to FIG. 3A, there is shown that the path of an incoming photon within the coating on the sample's surface may be increased by directing the incoming primary radiation towards the sample at lower angles, i.e. $\alpha_2 < \alpha_1$ increases the path length of primary radiation through the coating.

The path length of an X-ray photon within a sample depends on the material composition of the sample. The radiation intensity (I) of an incoming primary X-ray beam of a given wavelength after traveling a distance x within the sample is given by the formula:

$$I = I_0 \exp(-\mu_s \rho x)$$

where $I_0$ is the intensity of the primary radiation at the surface of the sample, p is the density of the sample, and $\mu_s$ is the mass absorption coefficient of the sample as a whole. The sample mass absorption coefficient $\mu_s$ is given by the following sum $$\mu_s = \sum_i \mu_i C_i$$

wherein $\mu_i$ is the mass absorption coefficient of a particular element in the sample, Ci is the concentration of this element in the sample, and the sum is over all materials present in the sample (or in the relevant part/region of the sample). Therefore, the average distance traveled by a photon of a given wavelength in the sample before it is absorbed by the sample depends on the composition of the sample.

Use of Scattering Plates

In an aspect of the present invention the intensity of the primary X-ray radiation arriving from the emitter to the sample is increased through the use of scattering interfaces (plates) at the emitting end/plane of the X-ray emitter. An X-ray source device may utilize collimating optics located in the irradiation channel in front of the emitting plane. The XRF system of the invention may utilize scattering interfaces either instead of or in combination with such collimators.

In commonly used XRF systems, the direction of the emitted X-ray beam is set by a collimator which absorbs any radiation which is emitted outside of a preselected narrow range of angles, eliminating most of the overall emitted radiation. The material of the collimator may indeed emit secondary radiation via a number of processes, most significantly due to the photoelectric effect and Compton scattering, however due to structure and design of the collimator all of this secondary radiation is absorbed by the material and none of it reaches the sample.

Figure 3B:
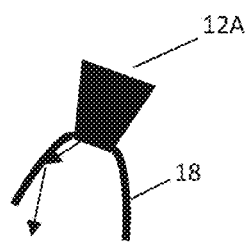

Turning back to FIG. 1A, there is shown that in the present invention, in order to reduce the loss of intensity by the collimation and consequently increase the intensity of the primary radiation from the emitter, at least one scattering plate/interface assembly 18 is accommodated at (attached to) the emitting end of the X-ray source. As more specifically illustrated in FIG. 3B, exemplifying an X-ray source unit 12A with a scattering plate assembly 18 at its emitting end portion, primary radiation reaching the scattering plates is absorbed by the material of the scattering plates, however due to the design of the scattering plates a significant fraction of secondary radiation emitted via various processes (photoelectric effect, Compton and Rayleigh scattering) is emitted in the direction to the sample. That is, the design of the scattering plates, as shown in FIG. 3B, allows a significant portion of the secondary radiation emitted from the scattering plates to reach the area on the sample surface which is irradiated by the emitter (instead of being re-absorbed by the apparatus as is the case with collimators).

The scattering plate assembly is preferably configured to provide interfaces with large cross sections for the photoelectric and Compton scattering in order to increase the secondary emission from the scattering plates.

In some embodiments of the present invention, the XRF system 12 includes a plurality of scattering plate structures 18 which may be assembled on the emitter, wherein each of scattering plate assembly is adapted to a particular application. For example, the material of the scattering plate assembly which emits secondary radiation in a particular wavelength band may be adapted for a measurement of particular pre-selected markers. The scattering plate assemblies may be each configured to be removably mounted on the emitter end portion, thus enabling replacement of the scattering plate assembly. Alternatively, or additionally, multiple scattering plate assemblies may be mounted on a common support structure, which is mountable on the emitter end portion and displaceable with respect to the emitter end portion to enable selectively shifting a required scattering plate assembly from its inoperative state (being outside the radiation propagation path) into an operative state to be in the radiation propagation path.

The invention claimed is:

1. A control system for controlling operation of an X-ray Fluorescent (XRF) system for detecting at least one material carried by a sample, the control system comprising:
    data input utility configured and operable for data communication with a storage utility, to obtain input data comprising material-related data about said at least one material carried by the sample;
    data processor and analyzer utility configured and operable to analyze the input data and determine optimal geometrical characteristics of the XRF system, and generate operational data indicative of corresponding optimal operational conditions of said XRF system, said optimal operational conditions comprising an operational condition of an X-ray source of the XRF system providing that maximized amount of primary X-ray radiation reaches a predetermined region of the sample and is absorbed by a volume of said region, and an operational condition of a detector of the XRF system providing that a portion of secondary radiation emitted from said region and reaching the detector is maximized; and
    data output utility configured and operable to generate output data comprising said operational data to the XRF system enabling adjustment of the geometrical characteristics of the XRF system.

2. The control system of claim 1, wherein said at least one material is associated with at least one marker carried by the sample.

3. The control system of claim 1, wherein said material-related data about said at least one material comprises at least one of the following: a location of said at least one material within the sample; a lateral dimension of a surface region of the sample where said at least one material is located; and a thickness of a structure of said at least one material defining said volume.

4. The control system of claim 1, wherein said geometrical characteristics of the XRF system to be optimized include at least two of the following: a distance between a primary radiation emitting plane of the XRF system and a sample plane; a distance between a detection plane of the XRF system and a sample plane; angular orientation of an irradiation channel defined by the XRF system; and angular orientation of a detection channel defined by the XRF system.

5. The control system of claim 4, wherein said geometrical characteristics comprise a configuration of a scattering plate assembly at an emitting end of an X-ray source used in the XRF system.

6. The control system of claim 1, wherein the data processor and analyzer is further configured and operable for processing measured data detected by the XFT system and identifying said at least one marker.

7. The control system of claim 1, wherein said maximized amount of the primary X-ray radiation reaching the predetermined region is such that the primary radiation is confined as much as possible to said volume of the surface region on the sample where said at least one material is present, to thereby increase probability of absorbing the primary radiation by said volume and reduce probability of penetration of the primary radiation through said volume into a bulk of the sample.

8. An X-ray Fluorescent (XRF) system for use in detection of at least one material carried by a sample, the XRF system comprising: an X-ray source for emitting primary radiation towards a sample plane; a detector for detecting secondary radiation from the sample; and a control system according to claim 1.

9. The XRF system of claim 8, wherein said at least one material is associated with at least marker carried by the sample.

10. The XRF system of claim 8, wherein the X-ray source comprises a scattering plate assembly at an emitting end portion thereof, said scattering plate assembly being configured for absorbing the primary radiation and emitting secondary radiation of a desired wavelength and direction of propagation towards a predetermined region on a sample plane.

11. The XRF system of claim 8, wherein the control system is configured and operable for receiving operational data and adjusting geometrical characteristics of the XRF system, said geometrical characteristics comprising at least one of the following: a distance between a primary radiation emitting plane of the X-ray source and a sample plane; a distance between a detection plane of the detector and a sample plane; angular orientation of an irradiation channel defined by the X-ray source; angular orientation of a detection channel defined by the detector; and configuration of the scattering plate assembly to be used in the X-ray source.

12. A method for use on X-ray Fluorescence (XRF) measurements on a sample for detecting at least one material carried by the sample, the method comprising:
providing material related data about said at least one material, said material related data comprising at least one of the following: a location of said at least one material within the sample; a lateral dimension of a surface region of the sample where said at least one material is located; and a thickness of a structure of said at least one material defining a desired absorbing volume of the sample;
analyzing the material related data and determining optimal geometrical characteristics of an XRF system to be used in the XRF measurements on said sample for optimizing operational conditions of the XRF system, to maximize amount of primary X-ray radiation that reaches said desired volume of the sample and is absorbed by said volume and to maximize a portion of secondary radiation emitted from said volume that reaches a detector of the XRF system; and
generating operational data to be provided to a controller of the XRF system for adjusting geometrical characteristics of the XRF system, said geometrical characteristics comprising at least one of the following: a distance between a primary radiation emitting plane of the XRF system and a sample plane; a distance between a detection plane of the XRF system and a sample plane; angular orientation of an irradiation channel defined by the XRF system; angular orientation of a detection channel defined by the XRF system; and a configuration of a scattering plate assembly at an emitting end portion of the XRF system.

13. The method of claim 12, wherein said at least one material is associated with at least one marker carried by the sample.

* * * * *